March 28, 1961  E. C. BONNER  2,976,675
VOLATILIZABLE GAS DRIVEN ENGINE
Filed Nov. 28, 1958  2 Sheets-Sheet 1
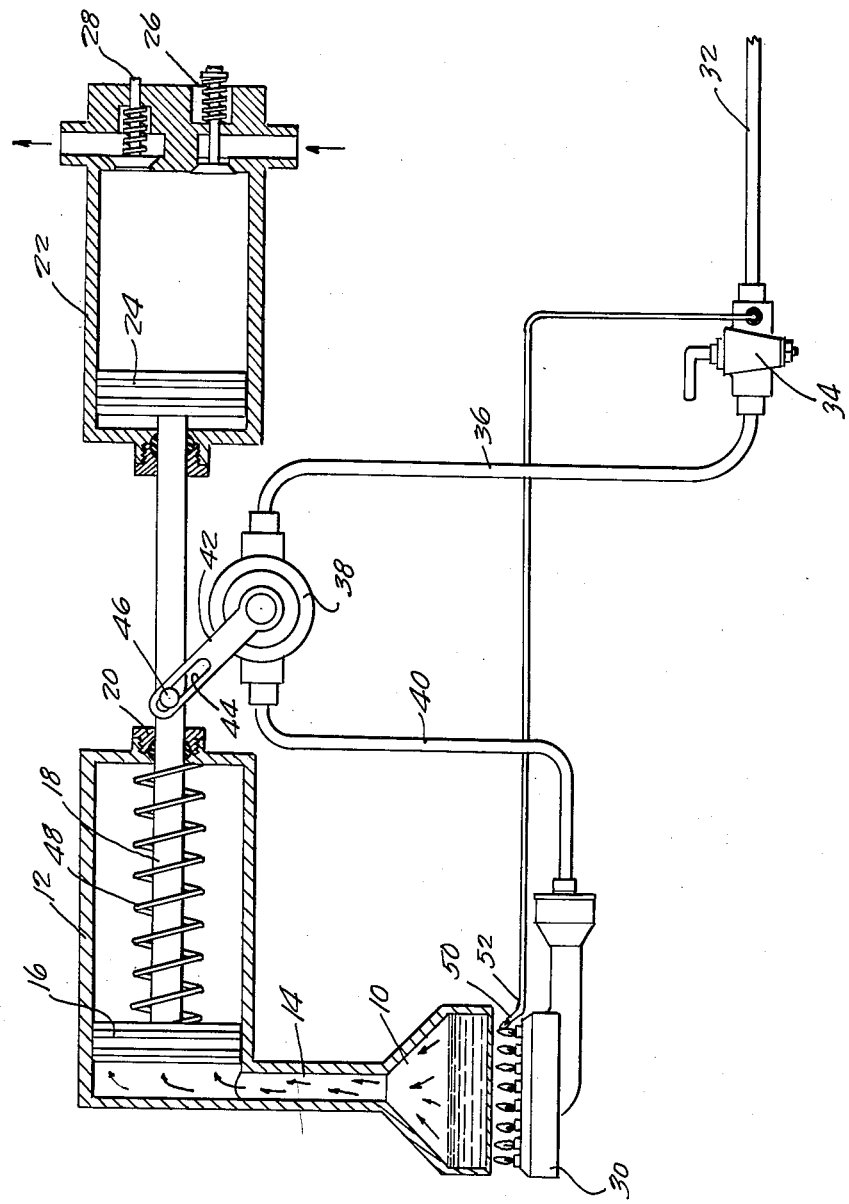
INVENTOR.
EDWARD C. BONNER,
BY
McMorrow, Berman & Davidson
ATTORNEYS.

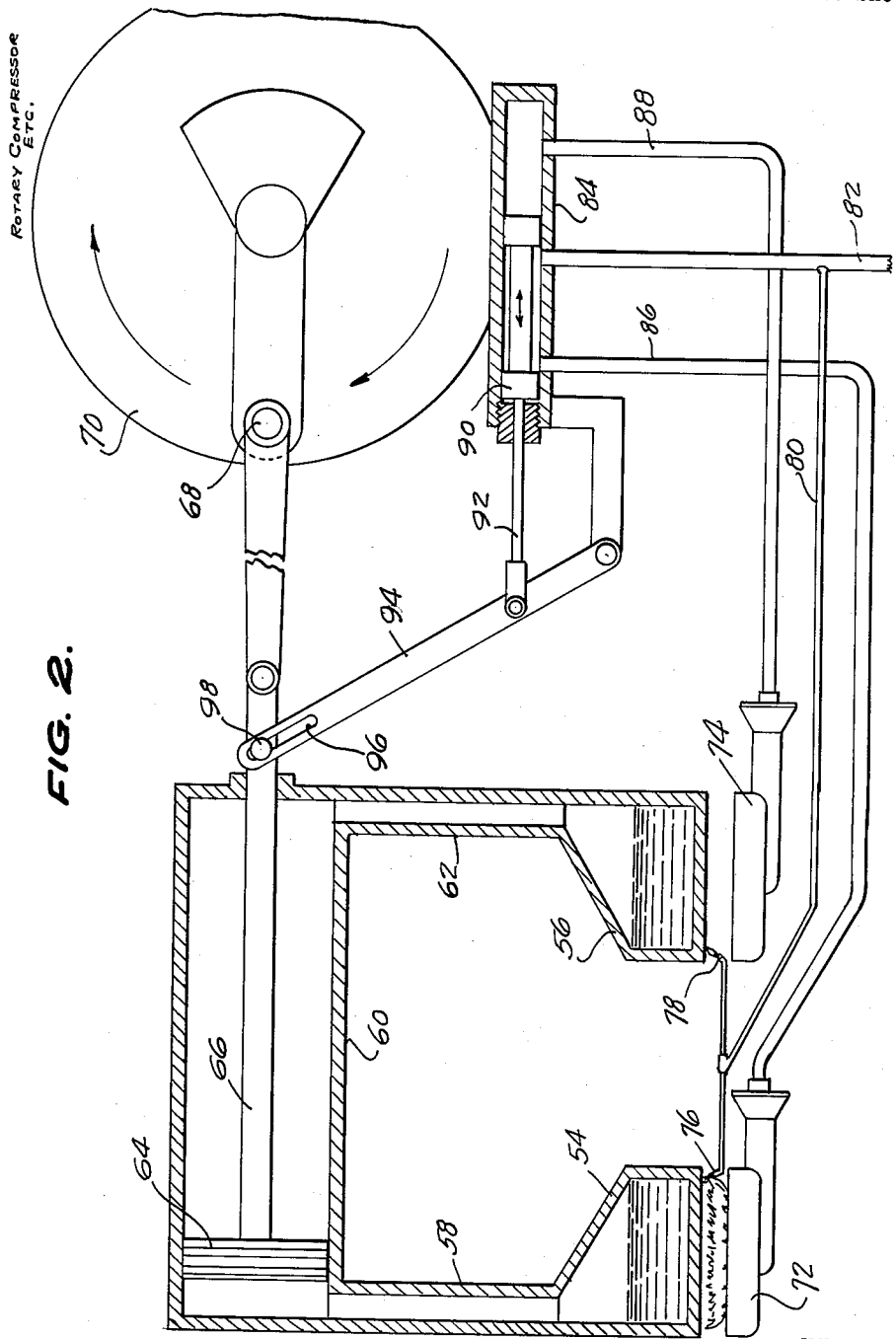

United States Patent Office 2,976,675
Patented Mar. 28, 1961

2,976,675

VOLATILIZABLE GAS DRIVEN ENGINE

Edward C. Bonner, 377 Bayview Ave., Apt. 8, Toronto, Ontario, Canada; Mary Bonner, administratrix of said Edward C. Bonner, deceased Filed Nov. 28, 1958, Ser. No. 776,894

2 Claims. (Cl. 60—25)

The present invention relates to a gas operated heat engine or power plant.

An object of the present invention is to provide a power plant employing gaseous fuel for converting heat into mechanical energy.

Another object of the present invention is to provide a power plant for domestic and commercial refrigeration equipment and other appliances which utilizes gaseous fuel commercially available.

A further object of the present invention is to provide a power plant which is efficient in operation, one safe and capable of instant starting, one quiet in operation, and one which may be constructed in any size to suit the power output requirements.

These and other objects and advantages of the present invention will be fully apparent from the following description when taken in conjunction with the annexed drawings, in which:

Figure 1 is a sectional view of the power plant of the present invention; and

Figure 2 is a sectional view of a modified form of the power plant of the present invention.

Referring in greater detail to the drawings in which like numerals indicate like parts throughout the several views, in Figure 1 the reference numeral 10 designates a closed chamber containing a charge of volatilizable material such as alcohol, sulphur dioxide, Freon 12 or Freon 113, or the like. A closed cylinder 12 is positioned adjacent the chamber 10 and a passageway 14 connects the chamber 10 with one end of the cylinder 12.

A piston 16 is slidable within the cylinder 12 between the ends of the latter and is normally adjacent one end of the cylinder 12, as shown in Figure 1.

A piston rod 18 extends out the other end of the cylinder 12 and has one end secured to the piston 16 and the other end exteriorly of the cylinder 12. A packing nut assembly 20 seals the piston rod 18 in the cylinder 12. The projecting end portion of the piston rod 18 extends into another cylinder 22 and is secured to a second piston 24. The cylinder 22 has an inlet valve assembly 26 and an outlet valve 28 arranged so that upon reciprocatory movement of the piston 24 fluid is drawn into the cylinder 22 and is discharged under pressure through the outlet valve 28.

A gas burner 30 is positioned exteriorly of the chamber 10 and is arranged so as to apply heat to the bottom of the chamber 10. A conduit 32 connects a source of gas under pressure with the main control valve 34 in the conduit 32. Another conduit 36 connects the valve 34 with another control valve 38 and a further conduit 40 connects the valve 38 with the burner 30. The valve 38 has an operating arm 42 provided with a closed slot 44 in which is slidable a pin 46 projecting from and perpendicular to the piston rod 18 at a point exteriorly of the cylinder 12.

The pin 46 and slot 44 constitute means connecting the other end portion of the piston rod 18 to the control valve 38 for movement of the arm 42 in the valve 38 between open and closed positions.

A coil spring 48 is circumposed about the portion of the piston rod 18 within the cylinder 12 and has one end bearing against the piston 16 and the other end bearing against the opposite end of the chamber 12. The spring 48 biases the piston 16 to the position at one end of the cylinder 12 remote from the valve 38.

The pilot light 50 is positioned adjacent the burner 30 and is connected by a pipe 52 to the conduit 32 for passage therethrough of gas from the conduit 32.

Referring to Figure 2, the reference numeral 54 represents a first chamber and the reference numeral 56 represents a second chamber arranged in spaced relation with respect to the first chamber 54. A first passageway 58 connects the upper end of the chamber 54 with one end of the cylinder 60 and another passageway 62 connects the upper end of the chamber 56 with the other end of the cylinder 60.

Each of the chambers 54 and 56 contains a charge of the volatile material as above described with reference to the chamber 10.

A piston 64 is slidable from one end to the other end of the cylinder 60 and a piston rod 66 has one end connected to the piston 64 and the other end exteriorly of the cylinder 60 and operatively connected to a crank pin 68 drivingly connected to a fly wheel 70 of an element to be driven.

A first burner 72 is positioned in heating relation with respect to the chamber 54 and another burner 74 is similarly positioned with respect to the chamber 56. Pilot lights 76 and 78 are positioned adjacent the burners 72 and 74. The pilot lights 76 and 78 are connected by a pipe 80 to a gas supply conduit 82. The conduit 82 is connected at one end to a source of gas under pressure and to a valve housing 84 at the other end. One end of the valve 84 is connected by a conduit 86 to the burner 72 and the other end of the valve housing 84 is connected by another conduit 88 to the burner 74. Within the valve housing 84 is a slidable valve 90 having an actuating rod 92 exteriorly of the housing 84. The rod 92 is connected intermediate the ends of a valve actuating arm 94 having a closed slot 96 inwardly of the free end thereof in which is slidable a pin 98 which projects from and is perpendicular to the piston rod 66 at a point exteriorly of the cylinder 60.

As will be readily understood from the drawing, when the piston 64 is at the end of the cylinder 60 contiguous to the passageway 58, the actuating arm 94 shifts the valve 90 to the position in which the supply conduit 82 is connected in communication with the conduit 86 and gas is permitted to flow to the burner 72. Upon movement of the piston 64 within the cylinder 60 to the end of the cylinder 60 adjacent the passageway 62, the actuating arm 94 shifts the valve 90 to the other end of the valve housing 84 to shut off communication between the supply conduit 82 and the burner 74 and to open communication between the burner 74 and the supply conduit 82.

In operation, in either of the forms of the invention shown the volatile fumes and vapors given off by the volatilizable material contained in the chamber 10 or in the chambers 54 and 56 when heated by the respective burner is in such volume as to provide the driving force to shift the associated piston 16, 64 within the respective cylinder 12, 60. In the first form of the engine shown in Figure 1, the spring 48 serves to return the piston 16 to the position adjacent the passageway 14 upon cooling and condensing of the volatile material contained within the chamber 10 after the gas flow to the burner 30 has been cut off by action of the valve actuating arm 42. In the form of the invention shown in Figure 2, the operation of the piston 64 is continuous when driven by the expanded volatile material in the chambers 54 and 56, alternatingly with corresponding alternating burning of gaseous fuel in the burners 72 and 74 as controlled by the valve 90 in the valve housing 84.

In each of the forms of the invention the output of the reciprocating piston 16, 64 may be converted to mechanical energy to operate a compressor or other device as desired.

What is claimed is:

1. In a power plant, a first closed chamber, a second closed chamber, a charge of volatilizable material in each of said chambers, a cylinder adjacent said chambers, a passageway connecting said first chamber with one end of said cylinder, another passageway connecting said second chamber with the other end of said cylinder, a piston slidable within said cylinder between the ends of the latter, a piston rod extending out of said other end of said cylinder and having one end secured to said piston and having the portion adjacent the other end exteriorly of said cylinder, said other end of said piston being adapted for connection to an element to be driven, a first burner exteriorly of said first chamber and arranged so as to apply heat to said first chamber, a second burner exteriorly of said second chamber and arranged so as to apply heat to said second chamber, a source of gaseous fuel, a conduit connecting said source to said first and second burners, a control valve movable in said conduit between a position opening said conduit to said first burner and closing said conduit to said second burner and a position closing said conduit to said first burner and opening said conduit to said second burner, means connecting said other end portion of said piston rod to said control valve so that said valve is moved to the last-named position responsive to movement of said piston from said one end of said cylinder to said other end of said cylinder and said valve is moved to the first-named position responsive to movement of said piston from said other end of said cylinder to said one end of said cylinder, said charges in said first and second chambers while alternatingly being heated by the gaseous fuel emitted from said first and second burners generating volatile fumes in said passageways of such volume as to provide the driving force to shift said piston from said one end of said cylinder to said other end of said cylinder and from said other end of said cylinder to said one end of said cylinder, and means to ignite said first and second burners when the gaseous fuel is directed thereto by said control valve.

2. In a power plant, a first closed chamber, a second closed chamber, a charge of volatilizable material in each of said chambers, a cylinder adjacent said chambers, a passageway connecting said first chamber with one end of said cylinder, another passageway connecting said second chamber with the other end of said cylinder, a piston slidable within said cylinder between the ends of the latter, a piston rod extending out of said other end of said cylinder and having one end secured to said piston and having the portion adjacent the other end exteriorly of said cylinder, said other end of said piston being adapted for connection to an element to be driven, a first burner exteriorly of said first chamber to apply heat to said first chamber, a second burner exteriorly of said second chamber and arranged so as to apply heat to said second chamber, a source of gaseous fuel, a conduit connecting said source to said first and second burners, a control valve movable in said conduit between a position opening said conduit to said first burner and closing said conduit to said second burner and a position closing said conduit to said first burner and opening said conduit to said second burner, means connecting said other end portion of said piston rod to said control valve so that said valve is moved to the last-named position responsive to movement of said piston from said one end of said cylinder to said other end of said cylinder and said valve is moved to the first-named position responsive to movement of said piston from said other end of said cylinder to said one end of said cylinder, said charges in said first and second chambers while alternatingly being heated by the gaseous fuel emitted from said first and second burners generating volatile fumes in said passageways of such volume as to provide the driving force to shift said piston from said one end of said cylinder to said other end of said cylinder and from said other end of said cylinder to said one end of said cylinder, and a pilot light adjacent each of said burners and connected in communication with said source and playing a flame on each of said burners.

References Cited in the file of this patent

UNITED STATES PATENTS

| 392,988 | Church | Nov. 20, 1888 |
| 1,856,586 | Persons | May 3, 1932 |
| 2,572,386 | Ray | Oct. 23, 1951 |
| 2,640,313 | Cobb | June 2, 1953 |
| 2,660,030 | Santos | Nov. 24, 1953 |

FOREIGN PATENTS

| 980,795 | France | Jan. 3, 1951 |